United States Patent
Rittmeyer

(10) Patent No.: US 9,035,517 B2
(45) Date of Patent: May 19, 2015

(54) GENERATOR BALL BEARING SUPPORT

(75) Inventor: Gregory Alan Rittmeyer, Winnebago, IL (US)

(73) Assignee: Hamilliton Sundstrand Corporation, Windsor Locks, CT (US)

( * ) Notice: Subject to any disclaimer, the term of this patent is extended or adjusted under 35 U.S.C. 154(b) by 603 days.

(21) Appl. No.: 13/359,955

(22) Filed: Jan. 27, 2012

(65) Prior Publication Data

US 2013/0193790 A1    Aug. 1, 2013

(51) Int. Cl.
*H02K 5/173* (2006.01)
*H02K 15/00* (2006.01)
*F16C 43/04* (2006.01)
*H02K 7/18* (2006.01)

(52) U.S. Cl.
CPC ......... *H02K 5/1735* (2013.01); *Y10T 29/49009* (2015.01); *H02K 5/173* (2013.01); *H02K 15/00* (2013.01); *F16C 43/04* (2013.01); *H02K 7/1823* (2013.01)

(58) Field of Classification Search
CPC ... H02K 5/173; H02K 5/1735; H02K 7/1823; H02K 15/00; F16C 43/03
USPC .......................... 310/89, 90, 91, 407; 384/585
IPC ..................... H02K 5/173, 15/00; F16C 43/04
See application file for complete search history.

(56) References Cited

U.S. PATENT DOCUMENTS

| 4,765,759 | A | 8/1988 | Le Breton et al. | |
| 4,801,833 | A * | 1/1989 | Dye | 310/239 |
| 5,920,133 | A | 7/1999 | Penswick et al. | |
| 5,960,623 | A | 10/1999 | Legrom | |
| 6,161,274 | A * | 12/2000 | Stark et al. | 29/596 |
| 6,883,967 | B2 | 4/2005 | Robb et al. | |
| 7,117,580 | B2 * | 10/2006 | Kudou et al. | 29/596 |
| 7,138,740 | B2 | 11/2006 | Mizutani et al. | |
| 7,262,537 | B2 | 8/2007 | Worley et al. | |
| 7,627,941 | B2 | 12/2009 | Shervington et al. | |
| 7,748,208 | B2 | 7/2010 | Jewess et al. | |
| 7,806,596 | B2 | 10/2010 | Shatz et al. | |
| 7,839,038 | B2 * | 11/2010 | Simofi-Ilyes et al. | 310/89 |
| 7,922,396 | B2 | 4/2011 | Mori | |
| 2008/0290749 | A1 * | 11/2008 | Holopainen | 310/89 |
| 2011/0316364 | A1 * | 12/2011 | Lin et al. | 310/43 |
| 2013/0193790 | A1 * | 8/2013 | Rittmeyer | 310/90 |

* cited by examiner

*Primary Examiner* — John K Kim
(74) *Attorney, Agent, or Firm* — Carlson, Gaskey & Olds, PC

(57) ABSTRACT

A bearing support plate for use in a generator has a radially enlarged flange with a first cylindrical portion extending from the flange in one direction which will provide a bearing support for an outer race of a ball bearing, and a radially inner cylindrical portion extending in an opposed direction that will be away from the ball bearing relative to the flange. The flange is generally cylindrical but has a truncated portion over a circumferential extent. The first cylindrical portion is formed with radially enlarged portions with intermediate radially thinner portions. The flange includes bolt holes circumferentially aligned with the radially thinner portions.

15 Claims, 3 Drawing Sheets

GENERATOR BALL BEARING SUPPORT

BACKGROUND OF THE INVENTION

This application relates to a ball bearing support plate for use in a generator.

Generators are often provided to receive a source of rotation, which drives a generator rotor within a generator stator. The rotation of the rotor within the stator creates electric current, which is then tapped for use elsewhere.

There are many applications wherein the source of rotation is very high speed, and thus complex bearing supports must be provide for the rotating elements. One example is a generator associated with a gas turbine engine such as in an aircraft application.

In one such application, a ball bearing supports a portion of a rotating component which rotates with the rotor on an inner race. The outer race is supported on a ball bearing support plate. One known support plate has a generally cylindrical shape, however, it is truncated across a portion of its circumference to provide room for receipt of an adjacent structure. The adjacent structure receives bolts securing an outer housing to external components.

The known ball bearing support plate has structural challenges due to this truncated portion.

SUMMARY OF THE INVENTION

A bearing support plate for use in a generator has a radially enlarged flange with a first cylindrical portion extending from the flange in one direction which will provide a bearing support for an outer race of a ball bearing. A radially inner second cylindrical portion extends in an opposed direction that will be away from the ball bearing relative to the flange. The flange is generally cylindrical but has a truncated portion over a circumferential extent. The first cylindrical portion is formed with radially enlarged portions and intermediate radially thinner portions. The flange includes bolt holes circumferentially aligned with the radially thinner portions. A generator and an assembly method are also disclosed.

These and other features may be best understood from the following drawings and specification.

DETAILED DESCRIPTION

Figure 1:
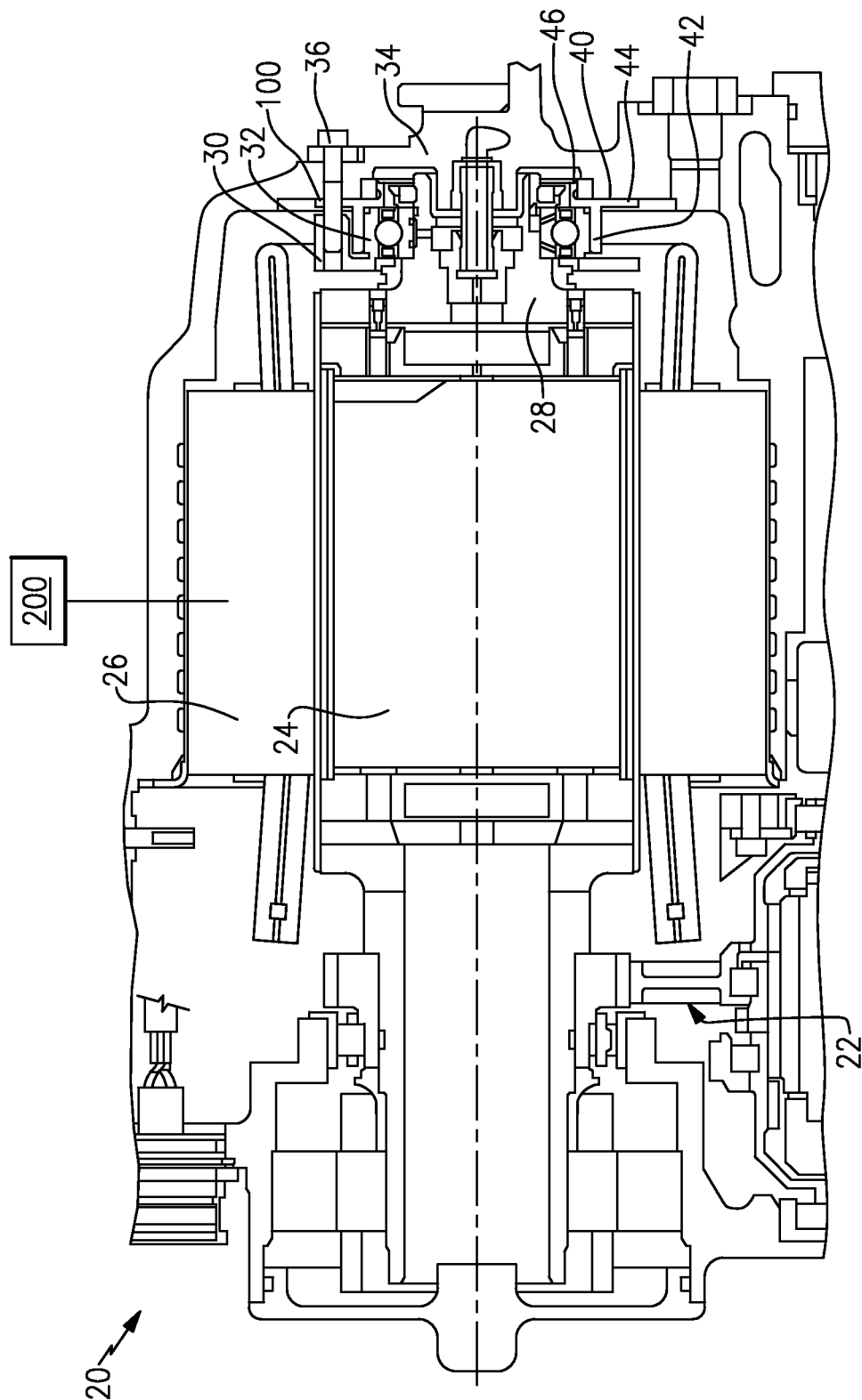
FIG. 1 is a cross-sectional view of a generator.

FIG. 1 shows a generator 20 having a source of rotation from drive gear 22. The external source of rotation may be a gas turbine engine rotor. The generator may be an integrated drive generator. In such generators, the generator structure compensates for variations in the input speed to drive a generator rotor 24 at a constant speed. Rotation of rotor 24 within a generator stator 26 creates electricity which may be tapped for use elsewhere. A use is shown schematically at 200.

A portion 28 that rotates with the rotor 24 may be known as a bearing rotor shaft, and extends into an inner race of a ball bearing 32. The bearing rotor shaft 28 rotates relative to the ball bearing 32. An outer housing 34 includes a plurality of bolts 36 (only one of which is shown) which bolt to a bolt receiving outer housing 30.

A bearing support 40 has a cylindrical portion 42 supporting an outer periphery of the ball bearing 32. A flange 44 extends radially outwardly from a central axis of the bearing support 40, and a cylindrical boss 46 extends away from the ball bearing at a radially inner location on the flange 44.

Figure 2:
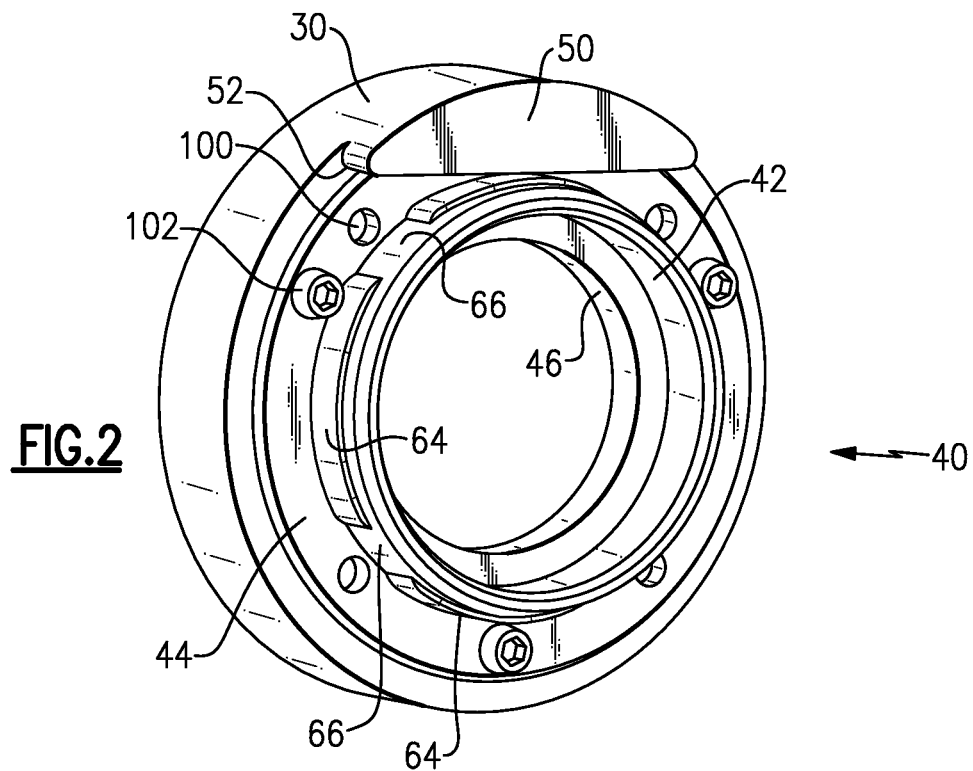
FIG. 2 shows a portion of a housing assembly for a ball bearing.

As shown in FIG. 2, the bearing support plate 40 has the flange 44, and the cylindrical boss 46. A truncated portion 52 is formed on the flange 44, which is otherwise generally cylindrical. A portion 50 of the outer housing 30 sits in the truncated portion. Bolt holes 102 receive bolts to secure the bearing support 40 to the outer housing 30. Other openings 100 receive the bolts 36 (see FIG. 1). As is clear from this Figure, there are radially enlarged portions 64 on the cylindrical portion 42 spaced by radially thinner portions 66. The radially thinner portions 66 are aligned with the pin holes 100.

Figure 3:
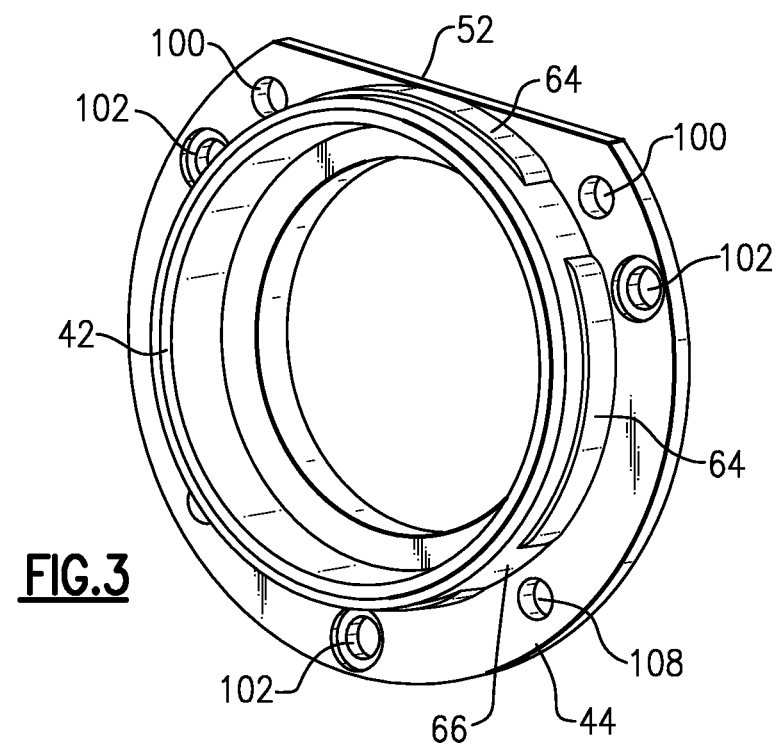
FIG. 3 shows a ball bearing support plate.

As shown in FIG. 3, the truncated portion 52 is also aligned with a radially enlarged portion 64. The bolt holes 100 are aligned with each of the thinner portions 66. There are four holes 100, four thinner portions 66, and four thicker portions 64 on the bearing support 40.

Figure 4:
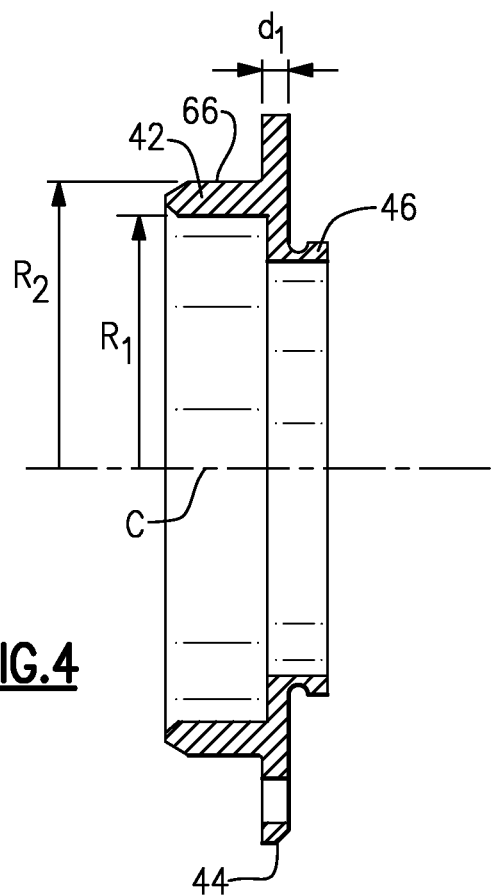
FIG. 4 is a cross-section through the FIG. 3 plate.

FIG. 4 is a cross-sectional view of the bearing support 40 and shows that an inner surface of the cylindrical portion 42 is at a radius $R_1$ and the outer periphery is at a radius $R_2$. Radius $R_2$ is to a thinner portion 66. The flange 44 extends along a central axis C for an axial distance $d_1$. In one embodiment of this bearing support, $R_1$ was 1.21" (3.07 cm). $R_2$ was 1.37" (3.47 cm) and $d_1$ was 0.135" (0.343 cm).

In the prior art bearing support, $R_1$ was 1.21" (3.07 cm), $R_2$ was 1.35" (3.42 cm), and $d_1$ was 0.090" (0.229 cm).

In various embodiments of the new bearing support, a ratio of $R_1$ to $R_2$ is between 0.88 and 0.89. A ratio of $R_1$ to $d_1$ is between 8.75 and 9.12.

Figure 5:
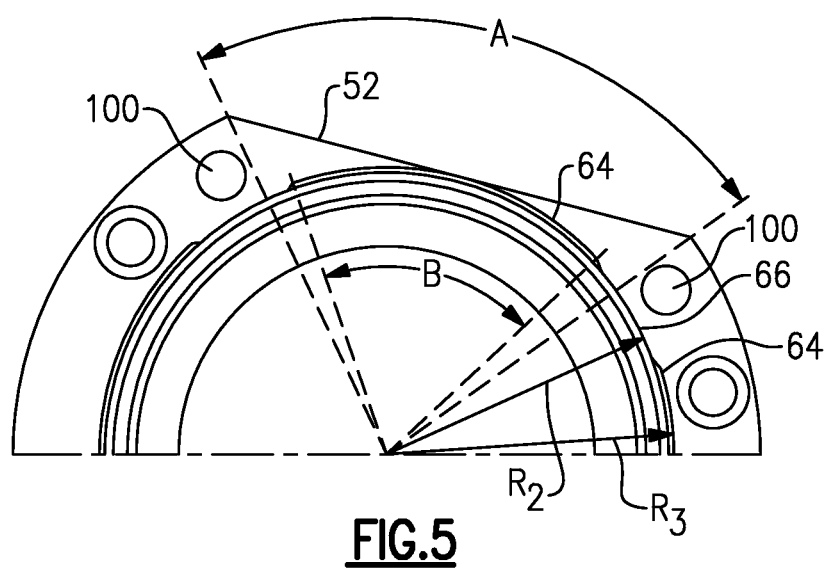
FIG. 5 is a front view of the ball bearing plate.

FIG. 5 shows that the radially enlarged portions 64 extend to a radius $R_3$. In one embodiment, $R_3$ was 1.38" (3.51 cm). In embodiments, a ratio of $R_3$ to $R_2$ is between 1.00 and 1.02. The truncated portion extends for an angle A. In one embodiment, A was 79.7°. In embodiments, A is between 78 and 81°. An angle B is the circumferential extent of the enlarged, or thicker, portions 64. In one embodiment, B was 65.40. In embodiments, B is between 63 and 67°.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A bearing support plate for use in a generator comprising:
    a radially enlarged flange, a first cylindrical portion extending from the flange in one direction which will provide a bearing support for an outer race of a ball bearing, and a radially inner second cylindrical portion extending in an opposed direction that will be away from the ball bearing relative to the flange, said flange being generally cylindrical but having a truncated portion over a circumferential extent, and said first cylindrical portion being formed with radially enlarged portions and intermediate radially thinner portions, and said flange including bolt holes circumferentially aligned with said radially thinner portions;
    a ratio of an inner first radius of said first cylindrical portion to a second radius to the outer diameter of said first cylindrical portion at a radially thinner portion being between 0.88 and 0.89; and said flange extending for an axial distance along a center axis of said bearing support plate, and a ratio of said first radius to said axial distance is between 8.75 and 9.12.

2. The bearing support plate as set forth in claim 1, wherein said truncated portion extends for a circumferential extent over an angle of between 78 and 81° measured from a center axis of said bearing support plate.

3. The bearing support plate as set forth in claim 1, wherein there are at least four of said bolt holes, and at least four of said radially thinner portions.

4. The bearing support plate as set forth in claim 1, wherein a ratio of a third radius to an outer periphery at one of said radially enlarged portions compared to said second radius at one of said radially thinner portions is between 1.00 and 1.02.

5. The bearing support plate as set forth in claim 1, wherein one of said radially enlarged portions is circumferentially aligned with said truncated portion.

6. The bearing support plate as set forth in claim 5, wherein said one of said radially enlarged portions extends for a circumferential extent about an angle between 63 and 67°.

7. A bearing support plate for use in a generator comprising:

a radially enlarged flange, a first cylindrical portion extending from the flange in one direction which will provide a bearing support for an outer race of a ball bearing, and a radially inner second cylindrical portion extending in an opposed direction that will be away from the ball bearing relative to the flange, said flange being generally cylindrical but having a truncated portion over a circumferential extent, and said first cylindrical portion being formed with radially enlarged portions and intermediate radially thinner portions, and said flange including bolt holes circumferentially aligned with said radially thinner portions; and said truncated portion extends for a circumferential extent over an angle of between 78 and 81° measured from a center axis of said bearing support plate, there are at least four of said bolt holes, at least four of said radially enlarged portions, and at least four of said radially thinner portions, a ratio of an inner first radius of said first cylindrical portion to a second radius to the outer diameter of said first cylindrical portion at a radially thinner portion is between 0.88 and 0.89, said flange extends for an axial distance along a center axis of said bearing support plate, and a ratio of said first radius to said axial distance is between 8.75 and 9.12, a ratio of a third radius to an outer periphery at one of said radially enlarged portions to said second radius at one of said radially thinner portions is between 1.00 and 1.02, and one of said radially enlarged portions is circumferentially aligned with said truncated portion, said one of said radially enlarged portions extends for a circumferential extent about an angle between 63 and 67°.

8. A generator comprising:
a generator rotor;
a generator stator;
a portion rotating with said rotor extending into a ball bearing, said ball bearing being associated with a bearing support plate, and there being a plurality of bolts securing an outer housing to a bolt receiving member, said bolt receiving member having an enlarged portion;
said bearing support plate including a radially enlarged flange, a first cylindrical portion extending from the flange in one direction to provide a bearing support for an outer race of said ball bearing;

a radially inner second cylindrical portion extending in an opposed direction away from said ball bearing relative to the flange, said flange being generally cylindrical but having a truncated portion over a circumferential extent, and said first cylindrical portion being formed with radially enlarged portions and intermediate radially thinner portions, and said flange including bolt holes circumferentially aligned with said radially thinner portions;

said enlarged portion of said bolt receiving member extending into said truncated portion, and there being bolts extending through said bolt holes and into said bolt receiving member; and a ratio of an inner first radius of said first cylindrical portion to a second radius to the outer diameter of said first cylindrical portion at a radially thinner portion being between 0.88 and 0.89, and said flange extending for an axial distance along a center axis of said bearing support plate, and a ratio of said first radius to said axial distance being between 8.75 and 9.12.

9. The generator as set forth in claim 8, wherein said truncated portion extends for a circumferential extent over an angle of between 78 and 81° measured from a center axis of said bearing support plate.

10. The generator as set forth in claim 8, wherein there are at least four of said bolt holes, at least four of said radially enlarged portions, and at least four of said radially smaller portions.

11. The generator as set forth in claim 8, wherein a ratio of a third radius to an outer periphery at one of said radially enlarged portions compared to said second radius at one of said radially thinner portions is between 1.00 and 1.02.

12. The generator as set forth in claim 8, wherein one of said radially enlarged portions is circumferentially aligned with said truncated portion.

13. The generator as set forth in claim 12, wherein said one of said radially enlarged portions extends for a circumferential extent about an angle between 63 and 67°.

14. A method of assembling a generator comprising the steps of:
inserting a bearing support plate into a generator, with the bearing support plate having a radially enlarged flange, and a first cylindrical portion extending from the flange in one direction, and said first cylindrical portion moved to be outwardly of an outer race of a ball bearing in the generator to provide a bearing support, the bearing support plate having a radially inner second cylindrical portion extending in an opposed direction away from said ball bearing relative to the flange, said flange being generally cylindrical but having a truncated portion over a circumferential extent, and a bolt receiving member having an enlarged portion of the outer housing aligned with said truncated portion as said bearing support plate is moved into the generator, said first cylindrical portion being formed with radially enlarged portions and intermediate radially thinner portions, and said flange including bolt holes circumferentially aligned with said radially thinner portions, and moving bolts through said bolt holes and into said bolt receiving member; and a ratio of an inner first radius of said first cylindrical portion to a second radius to the outer diameter of said first cylindrical portion at a radially thinner portion being between 0.88 and 0.89, and said flange extending for an axial distance along a center axis of said bearing support plate, and a ratio of said first radius to said axial distance being between 8.75 and 9.12.

15. A bearing support plate for use in a generator comprising:

a radially enlarged flange, a first cylindrical portion extending from the flange in one direction which will provide a bearing support for an outer race of a ball bearing, and a radially inner second cylindrical portion extending in an opposed direction that will be away from the ball bearing relative to the flange, said flange being generally cylindrical but having a truncated portion over a circumferential extent, and said first cylindrical portion being formed with radially enlarged portions and intermediate radially thinner portions, and said flange including bolt holes circumferentially aligned with said radially thinner portions;

one of said radially enlarged portions being circumferentially aligned with said truncated portion; and said one of said radially enlarged portions extending for a circumferential extent about an angle between 63 and 67°.

* * * * *